United States Patent
Nomura

(10) Patent No.: US 10,321,084 B2
(45) Date of Patent: Jun. 11, 2019

(54) DATA TRANSFER CIRCUIT, IMAGING CIRCUIT DEVICE, AND ELECTRONIC APPARATUS

(71) Applicant: SEIKO EPSON CORPORATION, Tokyo (JP)

(72) Inventor: Naoki Nomura, Fujimi-machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 214 days.

(21) Appl. No.: 15/202,096

(22) Filed: Jul. 5, 2016

(65) Prior Publication Data

US 2017/0026601 A1    Jan. 26, 2017

(30) Foreign Application Priority Data

Jul. 23, 2015  (JP) ................................ 2015-145930

(51) Int. Cl.
*H04N 5/378* (2011.01)
*H04N 5/376* (2011.01)
*H04N 5/225* (2006.01)

(52) U.S. Cl.
CPC .......... *H04N 5/378* (2013.01); *H04N 5/2258* (2013.01); *H04N 5/3765* (2013.01)

(58) Field of Classification Search
CPC ..... H04N 5/378; H04N 5/2258; H04N 5/3765
See application file for complete search history.

(56) References Cited

U.S. PATENT DOCUMENTS

| | | | | |
|---|---|---|---|---|
| 4,830,467 A | * | 5/1989 | Inoue | G09G 3/3629 345/94 |
| 2015/0373255 A1 | * | 12/2015 | Kim | H01L 27/14607 348/349 |
| 2016/0013224 A1 | * | 1/2016 | Kuwabara | H01L 27/14607 257/292 |
| 2016/0286151 A1 | * | 9/2016 | Lahav | H04N 5/37452 |

FOREIGN PATENT DOCUMENTS

| | | | |
|---|---|---|---|
| JP | H09-65215 A | | 3/1997 |
| JP | 2004-007282 A | | 1/2004 |
| JP | 2008103647 A | * | 5/2008 |
| JP | 2010-041077 A | | 2/2010 |

* cited by examiner

*Primary Examiner* — Antoinette T Spinks
(74) *Attorney, Agent, or Firm* — Oliff PLC

(57) ABSTRACT

A data transfer circuit that can suppress a voltage drop in a start signal without narrowing a process margin. The data transfer circuit includes N stages of register sections that are connected in series. A register section at an $n^{th}$ stage includes: a first transfer gate that transfers an analog signal; a second transfer gate that transfers one clock out of a clock signal, thereby generating an $(n+1)^{th}$ start signal for a register section at an $(n+1)^{th}$ stage; a control signal generation circuit that generates control signals for the first transfer gate and the second transfer gate; and a holding capacitor. The control signal generation circuit includes a third transfer gate that transfers an $n^{th}$ start signal that is input from a register section at an $(n-1)^{th}$ stage, and the third transfer gate is formed as a CMOS logic circuit.

20 Claims, 7 Drawing Sheets

DATA TRANSFER CIRCUIT, IMAGING CIRCUIT DEVICE, AND ELECTRONIC APPARATUS

BACKGROUND

1. Technical Field

The present invention relates to a data transfer circuit, an imaging circuit device, an electronic apparatus, and the like.

2. Related Art

JP-A-9-65215 discloses a solid-state imaging device in which the cathodes of photodiodes with which pixels are configured are connected to a shared signal line via first amplifiers that are respectively provided for the photodiodes and selection switches that are sequentially selected by a shift register.

Here, in the case where an imaging circuit device is configured as an IC chip, there is a demand for reducing the length and the area of the IC chip.

Furthermore, there is a demand for imaging circuit devices to stably transfer and output pixel signals without being affected by variations in the characteristics (e.g., the threshold Vth) of the transistors that constitute the internal circuits, or variations in the power supply voltage.

SUMMARY

An advantage of some aspects of the invention is to provide a data transfer circuit that has a simple circuit configuration and that is capable of stably transferring pixel signals without narrowing the process margin, and to provide an imaging circuit device and an electronic apparatus that use the data transfer circuit.

(1) One aspect of the invention relates to a data transfer circuit that includes:

N stages of register sections that are connected in series and that respectively control transfer timings of N analogue signals, where N is an integer that is greater than or equal to 3, wherein a register section at an $n^{th}$ (1<n<N) stage includes:

a first transfer gate that transfers one analogue signal out of the N analogue signals;

a second transfer gate that transfers one clock out of a clock signal, thereby generating an $(n+1)^{th}$ start signal for a register section at an $(n+1)^{th}$ stage;

a control signal generation circuit that generates control signals for the first transfer gate and the second transfer gate; and a holding capacitor whose one end is connected to an output node of the control signal generation circuit, and that holds a voltage of the output node, the control signal generation circuit includes a third transfer gate that transfers an $n^{th}$ start signal that is input from a register section at an $(n-1)^{th}$ stage, based on the $n^{th}$ start signal, and the third transfer gate is configured as a CMOS logic circuit.

According to one aspect of the invention, the third transfer gate transfers the $n^{th}$ start signal that is input from the register section at the $(n-1)^{th}$ stage, based on the $n^{th}$ start signal, thereby charging the holding capacitor with the voltage of the $n^{th}$ start signal. Due to this voltage that is held, the first transfer gate is turned ON and the analogue signal is transferred. In addition, the second transfer gate is turned ON and transfers one clock out of the clock signal, thereby generating the $(n+1)^{th}$ start signal for the register section at the $(n+1)^{th}$ stage. Here, the third transfer gate is a CMOS logic circuit, and therefore the voltage of the $n^{th}$ start signal does not drop at the third transfer gate, and the holding capacitor is charged with this voltage. For this reason, it is possible to reliably turn ON the first transfer gate and the second transfer gate. Therefore, it is possible to prevent the voltage of the $(n+1)^{th}$ start signal from dropping. Furthermore, the transfer capability of the third transfer gate configured as a CMOS logic circuit has less constraints of the threshold value, and therefore the process margin does not become narrow. In this way, using a simple circuit configuration, it is possible to reduce the length and the area of the IC chip, and it is possible to stably transfer and output signals without being affected by variations in the characteristics of the transistors that constitute the circuits, or variations in the power supply voltage.

(2) According to one aspect of the invention, the control signal generation circuit may include: a first reset transistor that resets an electric potential of an input node of the third transfer gate based on the clock signal; and a second reset transistor that resets an electric potential of the output node based on an $(n+2)^{th}$ start signal that is output from a second transfer gate of the register section at the $(n+1)^{th}$ stage.

If this is the case, the first reset transistor resets the electric potential of the input node of the third transfer gate, and therefore the holding capacitor is not charged with abnormal voltage when the $n^{th}$ start signal becomes active. Also, the second reset transistor resets the electric potential of the output node, and therefore it is possible to reliably turn OFF the first transfer gate and the second transfer gate.

(3) According to one aspect of the invention, the clock signal that is input to the second transfer gate of the register section at the $n^{th}$ stage and a clock signal that is input to the second transfer gate of the register section at the $(n+1)^{th}$ stage may have an inverse relation with each other. With this configuration, it is unnecessary to additionally provide the even-numbered register sections with an element for inverting the clock signal, for example.

(4) According to one aspect of the invention, the second transfer gate may be formed as a CMOS logic circuit. With this configuration, the voltage of the $(n+1)^{th}$ start signal generated by the second transfer gate does not drop at the time of transfer.

(5) According to one aspect of the invention, the first transfer gate may be formed as a CMOS logic circuit. With this configuration, the voltage of the analogue signal transferred by the first transfer gate does not drop at the time of transfer.

(6) One aspect of the invention may further include a reset state maintaining circuit that maintains a reset electric potential of the output node even after the second reset transistor is turned OFF, the reset electric potential resulting from resetting performed by the second reset transistor. With this configuration, a malfunction due to noise or the like does not occur.

(7) One aspect of the invention may further include: an NMOS transistor that is connected to the output node and ground; and an inverting logic circuit that inverts the voltage of the output node, and supplies the inverted voltage to a control terminal of at least one of the first transfer gate and the second transfer gate and to a gate of the NMOS transistor, the first transfer gate and the second transfer gate each being formed with a CMOS logic circuit. The inverting logic circuit that has been additionally provided, originally for the purpose of controlling at least one of the first transfer gate and the second transfer gate, can cause the NMOS transistor to operate as the reset state maintaining circuit.

(8) One aspect of the invention may further include: a first inverting logic circuit that inverts the voltage of the output node, and supplies the inverted voltage to a control terminal of at least one of the first transfer gate and the second transfer gate, the first transfer gate and the second transfer gate each being formed with a CMOS logic circuit; and a second inverting logic circuit that is connected in parallel with the first inverting logic circuit, and inverts an output from the first inverting logic circuit. The first inverting logic circuit that has been additionally provided, originally for the purpose of controlling at least one of the first transfer gate and the second transfer gate, and the second inverting logic circuit, constitute a latch circuit, which can be operated to serve as the reset state maintaining circuit.

(9) According to one aspect of the invention, another end of the holding capacitor may be fixed at a predetermined electric potential. The voltage with which the holding capacitor is charged does not unnecessarily vary, and therefore it is possible to stably turn ON the first transfer gate and the second transfer gate.

(10) Another aspect of the invention relates to an imaging circuit device, including:

a pixel section in which a light-receiving element is disposed in each of a plurality of pixels;

a read-out circuit section that reads out electric charge from the pixel section; and a control circuit section that performs control to output pixel signals based on the read-out electric charge, wherein the read-out circuit section includes any of the above-described data transfer circuits.

(11) Yet another aspect of the invention defines an electronic apparatus that includes one imaging circuit device described above or a plurality of imaging circuit devices described above that are connected in series. Examples of this kind of electronic apparatus include a scanner device that uses the imaging circuit device as an image sensor, and a multifunctional machine in which a scanner device and a printer and/or a copier coexist.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following is a detailed description of a preferred embodiment of the invention. Note that the embodiment described below are not intended to unduly limit the content of the invention recited in the claims, and all of the configurations described in the embodiments are not necessarily essential as solutions provided by the invention.

1. Electronic Apparatus

Figure 1:
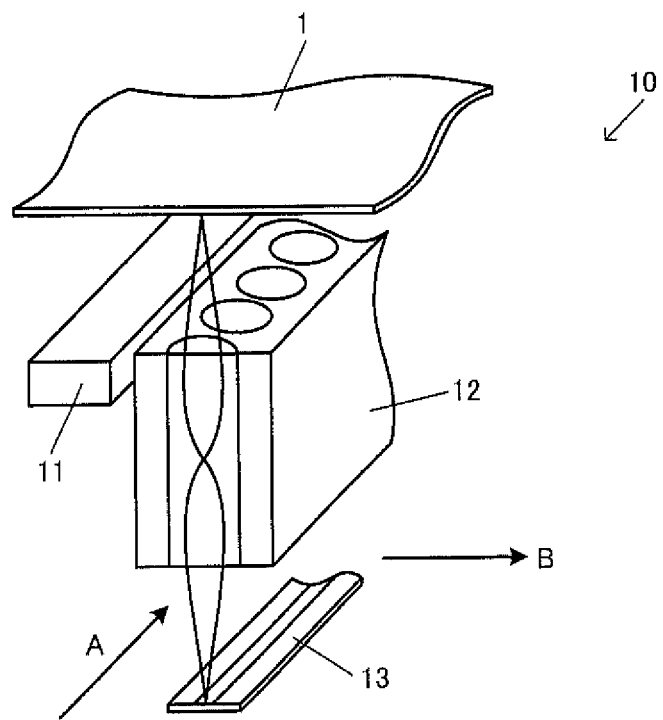
FIG. 1 is a diagram showing a CIS module that is used in a contact image sensor (CIS) type scanner device, which is one embodiment of an electronic apparatus according to one aspect of the invention.

FIG. 1 is a diagram showing a CIS module 10 that is used in a contact image sensor (CIS) type scanner device for example, which is an embodiment of an electronic apparatus according to the invention. In FIG. 1, the CIS module 10 has: a light guide 11 that irradiates a document 1 with light; a lens array 12 that forms an image from reflection light from the document 1; and an image sensor 13 that has optical elements such as photodiodes serving as pixels at image forming positions.

The light guide 11 has a light source 14 (refer to FIG. 2) that causes light to enter an end portion of the light guide 11, for example. The light guide 11 guides light such that the entire range of the document 1 in the horizontal scanning direction is irradiated with the light source light from the light source such as an LED 14. The lens array 12 is formed as a rod lens array or the like, for example. The image sensor 13 has a large number of pixels arranged in a horizontal scanning direction A, and is moved integrally with the light guide 11 and the lens array 12 in a vertical scanning direction B. CIS type scanner devices have a short light path, are suited to reduction in the thickness, have a small number of parts, consume a small amount of power, and are cheap. In these points, CIS type scanner devices are more advantageous than optical reduction type scanner devices.

Figure 2:
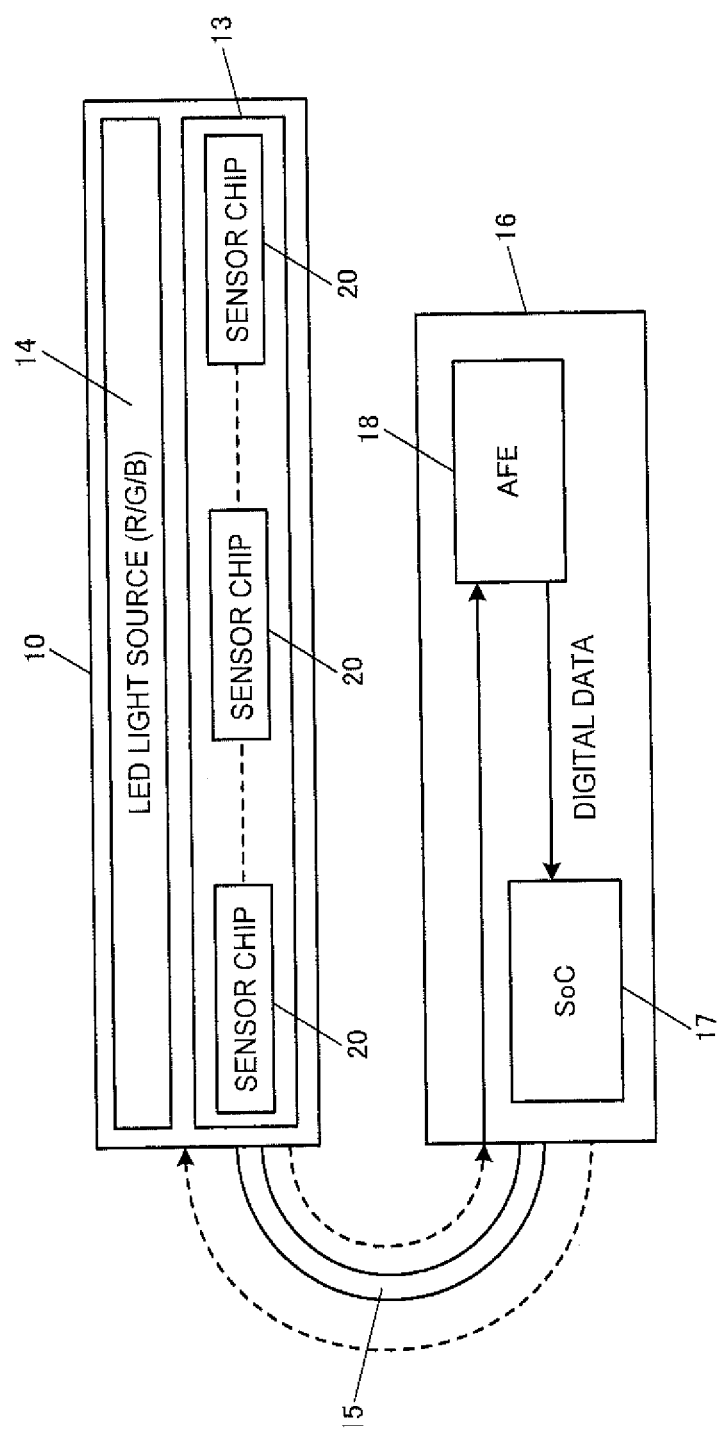
FIG. 2 is a diagram showing a main substrate that is connected to the CIS module shown in FIG. 1 via flexible wiring.

As shown in FIG. 2, the image sensor 13 may be configured with a plurality of image sensor chips 20 that are connected in series. In the embodiment, twelve image sensor chips 20 are connected in series, for example. Each image sensor chip 20 has 864 pixels, for example. The twelve image sensor chips have 864×12=10368 pixels in total. Each image sensor chip 20 has an elongated rectangular shape whose long sides are 18 mm to 20 mm long, for example, and whose short sides are 0.5 mm long or shorter, for example.

As shown in FIG. 2, the CIS module 10 that is moved in the vertical scanning direction is connected to, via flexible wiring 15, a main substrate 16 that is fixed to the scanner device. The main substrate 16 is equipped with a system-on-a-chip (SoC) 17 and an analogue front end (AFE) 18. The system-on-a-chip (SoC) 17 supplies clock signals, control signals, and the like to the CIS module 10. The main substrate 16 supplies power supply voltage, reference voltage, and the like to the CIS module 10. Pixel signals (pieces of analogue data) from the CIS module 10 are supplied to the analogue front end (AFE) 18. The analogue front end (AFE) 18 applies analogue/digital conversion on the pixel signals, and outputs digital pixel data to the system-on-a-chip (SoC) 17. Note that the CIS module 10 may be equipped with a power supply IC, the analogue front end (AFE) 18, a light source driver, and the like.

2. Imaging Circuit Device (Image Sensor Chip)

2.1 Circuit Layout

Figure 3:
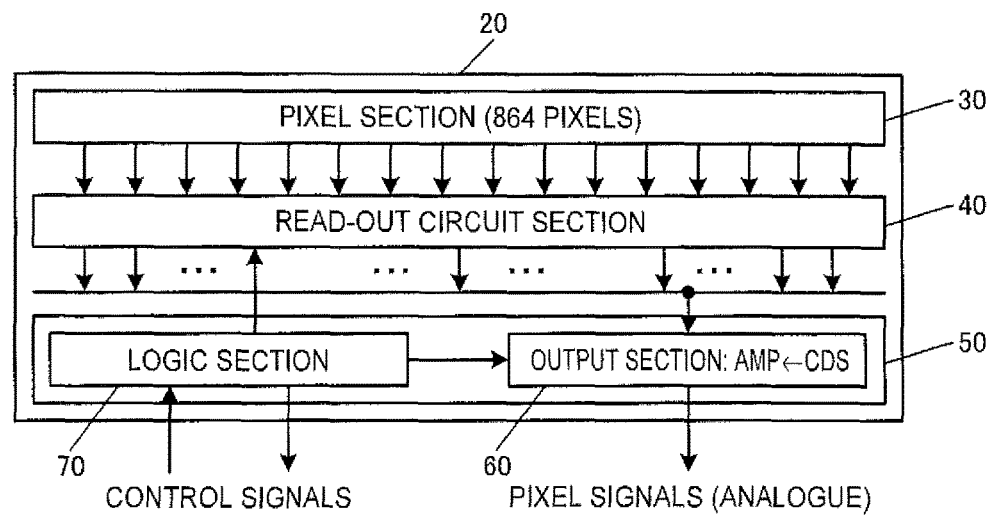
FIG. 3 is a schematic block diagram for an imaging circuit device (an image sensor chip).

FIG. 3 shows a schematic block diagram for the image sensor chip 20. The image sensor chip 20 may include: a pixel section 30 in which a light-receiving element (e.g., a photodiode) is disposed in each of a plurality of pixels (e.g., 864 pixels); a read-out circuit section 40 that converts electric charge from the pixel section 30 into voltage and reads out the voltage; and a control circuit section 50 that performs control to output pixel signals, based on the output voltage from the read-out circuit section 40. FIG. 3 shows an example in which the control circuit section 50 has an output section 60 and a logic section (logic circuit) 70.

Figure 4:
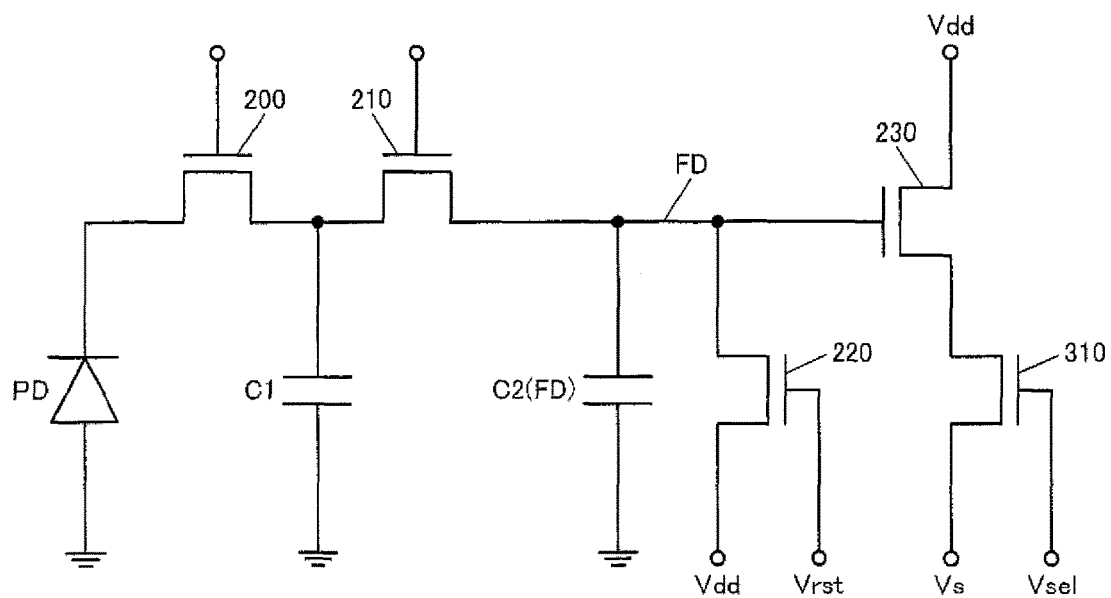
FIG. 4 is a circuit diagram showing one pixel and a read-out section thereof.

2.2. Pixel Section and Read-Out Circuit Section 2.2.1 Operating Principles of Pixel Section and Read-Out Circuit Section FIG. 4 is a circuit diagram showing one pixel and the read-out section thereof. In FIG. 4, a light-receiving element having a photoelectric conversion function, which is a photodiode PD for example, is disposed in the one pixel in the pixel section 30. The photodiode PD stores, in the cathode, electric charge that corresponds to the intensity of the received light.

In order to read out the signal electric charge from the photodiode PD of the one pixel, the read-out circuit section 40 has: a first transfer gate (an anterior stage side transfer gate) 200; an intermediate storage capacitor C1; a second transfer gate (a posterior stage side transfer gate) 210; a charge-to-voltage conversion capacitor C2; a reset transistor 220; a pixel output transistor 230; and a selection transistor 310. The charge-to-voltage conversion capacitor C2 is provided in a floating diffusion region FD (floating diffusion). The photodiode PD, the first transfer gate 200, and the second transfer gate 210 are connected in series between a constant voltage VSS and the floating diffusion FD. Note that the functions of the selection transistor 310 may be included in the functions of the data transfer circuit described below.

The first transfer gate 200 transfers the electric charge stored in the photodiode PD to an intermediate storage capacitor C1. The second transfer gate 210 transfers the electric charge stored in the intermediate storage capacitor C1 to the charge-to-voltage conversion capacitor C2 (the floating diffusion FD). The charge-to-voltage conversion capacitor C2 performs conversion of electric charge to voltage. The reset transistor 220 resets the electric potential of the charge-to-voltage conversion capacitor C2 (the floating diffusion FD) to the potential in the initial state. The pixel output transistor 230 outputs voltage corresponding to the voltage that results from the conversion performed by the charge-to-voltage conversion capacitor C2 (floating diffusion FD). The selection transistor 310 selects the output from the pixel output transistor 230 in the order along the horizontal scanning direction. The output from the selection transistor 310 serves as an output voltage Vs from the read-out circuit section 40.

2.2.2. Data Transfer Circuit 2.2.2.1. Configuration of Embodiment

Figure 5:
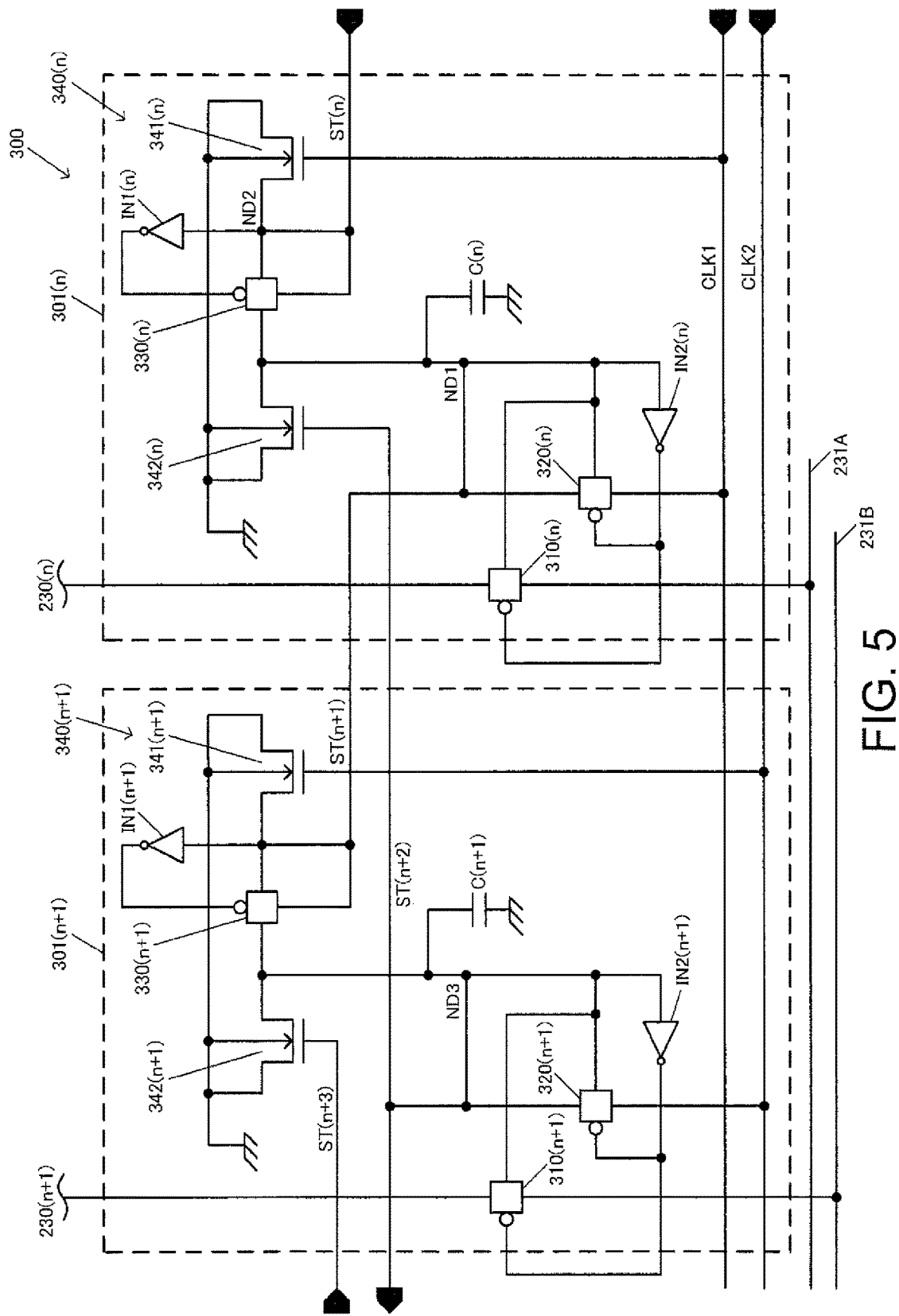
FIG. 5 is a diagram showing two register sections of a data transfer circuit.

A data transfer circuit 300, which is shown in FIG. 5, is provided at the last stage in the read-out circuit section 40 shown in FIG. 3. Here, the functions of the selection transistor 310 shown in FIG. 4 are not included in the functions of the pixel section 30, but in the functions of the data transfer circuit 300.

The data transfer circuit 300 includes N stages of register sections (read-out units) 301 that are connected in series and respectively control the transfer timings of N analogue signals (N denotes an integer that is greater than or equal to 3, and N is 216 in the embodiment). FIG. 5 shows a register section 301($n$) at the $n^{th}$ stage (1<n<N) and a register section 301($n$+1) at the (n+1)$^{th}$ stage. Note that the register section 301(1) at the first stage (n=1) is different from the register section 301($n$) at the $n^{th}$ stage in that the register section 301(1) receives an start signal (a chip start signal) that is input from the outside. The register section 301(N) at the last stage (n=N) is different from the register section 301($n$) at the $n^{th}$ stage (1<n<N) in that the register section 301(N) outputs a start signal (a chip start signal) to the outside. The data transfer circuit 300 may have two output signal lines 231A and 231B. Analogue signals that are read out via odd-numbered register sections 301 are output to the output signal line 231A, and analogue signals that are read out via even-numbered register sections 301 are output to the output signal line 231B. For this reason, there is no problem even if the on- (high-) periods of drive signals for a first transfer gate 310($n$) and a first transfer gate 310($n$+1) overlap each other.

The register sections 301 at the respective stages have the same configuration. Here, a description is given of the register section 301($n$). The register section 301($n$) has the first transfer gate 310($n$), a second transfer gate 320($n$), and a third transfer gate 330($n$). The first transfer gate 310($n$) transfers a pixel signal (an analogue signal) from the pixel output transistor 230 (230($n$)) shown in FIG. 4. In other words, the first transfer gate 310($n$) performs the functions of the selection transistor 310 illustrated in FIG. 4. The second transfer gate 320($n$) transfers one clock out of an input clock signal CLK1 so that the clock serves as a start signal for the next ((n+1)$^{th}$) stage. The third transfer gate 330($n$) transfers a start signal ST(n) that has been output from the register section 301($n$−1) at the previous ((n−1)$^{th}$) stage.

A control signal generation circuit 340($n$) that generates control signals for the first transfer gate 310($n$) and the second transfer gate 320($n$) includes the third transfer gate 330($n$). In the embodiment, the first transfer gate 310($n$), the second transfer gate 320($n$), and the third transfer gate 330($n$) are formed as CMOS logic circuits (e.g., CMOS transfer gates). Each transfer gate is provided for the purpose of transferring signals at the HIGH level without causing a voltage drop. A first inverter IN1($n$) and a second inverter IN2($n$) are provided in order to drive the first transfer gate 310($n$), the second transfer gate 320($n$), and the third transfer gate 330($n$).

A holding capacitor C(n) is provided between an output node ND1 of the control signal generation circuit 340($n$) and ground.

The control signal generation circuit 340($n$) includes a first reset transistor 341($n$) that resets the electric potential of an input node ND2 of the third transfer gate 330($n$) formed as a CMOS logic circuit, based on a clock signal CLK1. The control signal generation circuit 340($n$) further includes a second reset transistor 342($n$) that resets the electric potential of the output node ND1 of the control signal generation circuit 340($n$), based on a start signal ST(n+2) from a second transfer gate 320($n$+1) of the register section 301(N+1) at the (n+1)$^{th}$ stage. Note that the clock signal CLK1, which are input to the second transfer gate 320($n$) of the register section 301($n$) at the $n^{th}$ stage, and clock signal CLK2, which is input to the second transfer gates 320($n$+1) and 320($n$−1) of the register sections 301($n$+1) and 301($n$−1) at the (n+1)$^{th}$ and the (n−1)$^{th}$ stages, have an inverse relation with each other.

2.2.2.2. Operations of Embodiment

Figure 6:
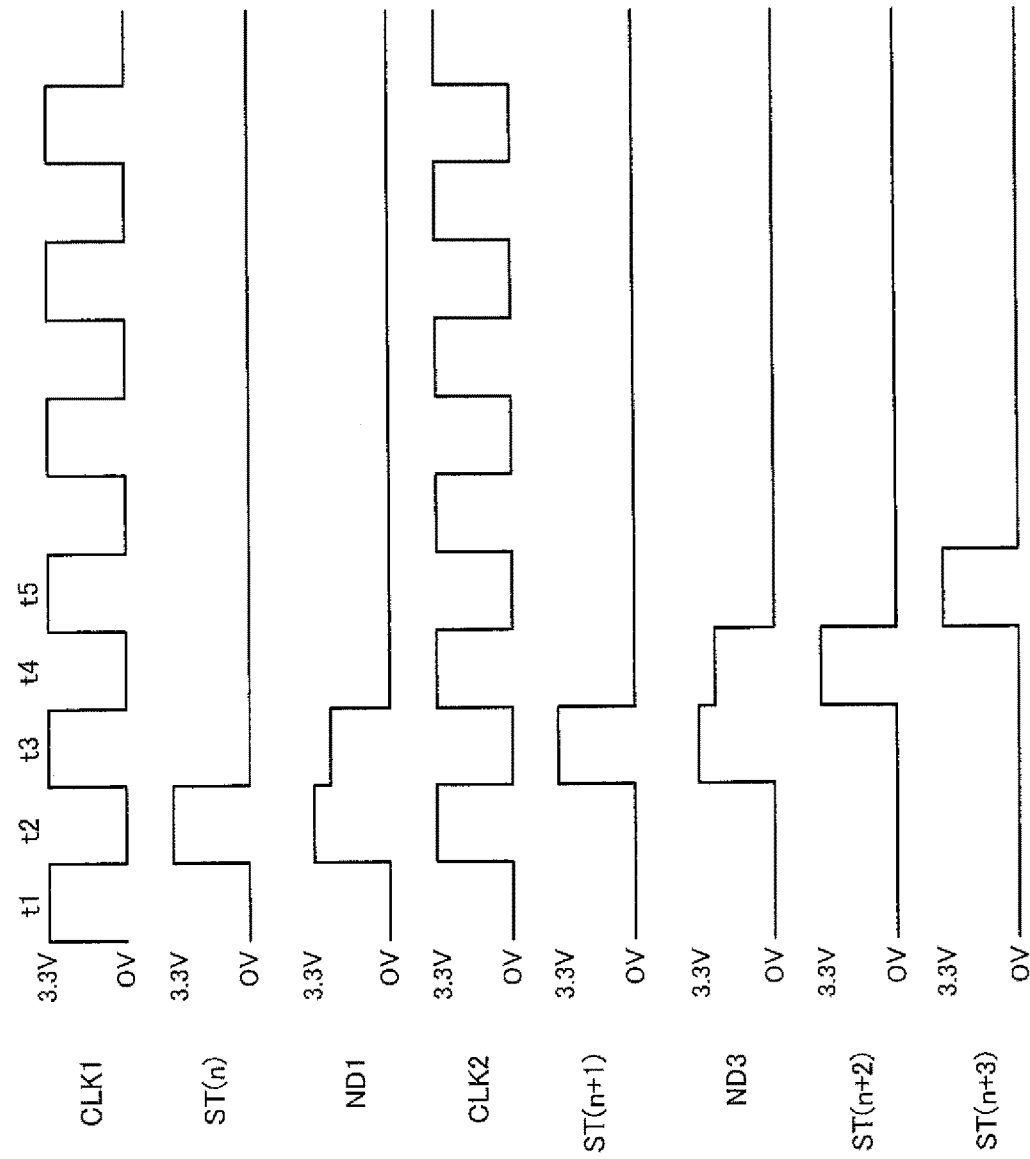
FIG. 6 is a timing chart illustrating operations of the data transfer circuit shown in FIG. 5.

A description is given of the operations of the data transfer circuit 300 according to the embodiment shown in FIG. 5 with reference to the timing chart shown in FIG. 6. When the clock signal CLK1 is HIGH (at time t1), the first reset transistor 341($n$), which is configured with an NMOS for example, is ON, and the input node ND2 is at the voltage VSS.

When the clock signal CLK1 is LOW and the start signal ST(n) from the register section 301(n−1) at the previous ((n−1)$^{th}$) stage is HIGH (at time t2), the input node ND2 is at a voltage Vdd. Also, the third transfer gate 330(n), which is a CMOS logic circuit, is turned ON by the start signal ST(n), and accordingly the electric potential of the output node ND1 equals the electric potential Vdd of the input node ND2, and the holding capacitor C(n) is charged with this voltage. In other words, at time t2, the output node ND1 is prevented from having a voltage drop. At this point in time, the first transfer gate 310(n) and the second transfer gate 320(n) are turned ON.

Subsequently, when the clock signal CLK1 is HIGH and the clock signal CLK2 is LOW (at time t3), the third transfer gate 330(n) is turned OFF, and the output node ND1 enters a floating state. However, the electric potential of the output node ND1 is held by the holding capacitor C(n). The holding capacitor C(n) according to the embodiment can hold a voltage that is sufficient to maintain the first transfer gate 310(n) and the second transfer gate 320(n) in the ON-state. Thus, the first transfer gate 310(n) and the second transfer gate 320(n) are maintained in the ON-state. Therefore, the first transfer gate 310(n) can transfer the pixel signals from the pixel output transistor 230 (230(n)) shown in FIG. 4. Also, a second transfer gate 320(n) can transfer the clock signal CLK1 at the HIGH level without causing a voltage drop, and can thus output a start signal ST(n+1) to the register section 301(n+1) at the next ((n+1)$^{th}$) stage.

At time t4 as well, in the register section 301(n+1) at the next ((n+1)$^{th}$) stage, the first transfer gate 310(n+1) can transfer the pixel signals from the pixel output transistor 230 shown in FIG. 4. Also, a second transfer gate 320(n+1) can transfer the clock signal CLK2 at the HIGH level without causing a voltage drop, and can thus output a start signal ST(n+2) to the register section 301(n+2) at the (n+2)$^{th}$ stage.

Here, if the first transfer gate 310(n), the second transfer gate 320(n) and the third transfer gate 330(n) are configured with one type of transistor out of NMOS and PMOS transistors, their characteristics are vulnerable to variations in the threshold value Vth of the transistors and a drop in the power supply voltage. Therefore, there is the risk of the voltage of the start signal and the like decreasing in a downstream direction of the shifting, and there also is the risk of the voltage of the pixel signals varying. In addition, if there are constraints on the threshold value Vth, the process margin becomes narrow. In contrast, according to the embodiment, the transfer gates are formed as CMOS logic circuits. Therefore, the transfer gates can stably transfer and output the start signals and the pixel signals without being affected by variations in the threshold Vth of the transistors or a drop in the power supply voltage.

Figure 7:
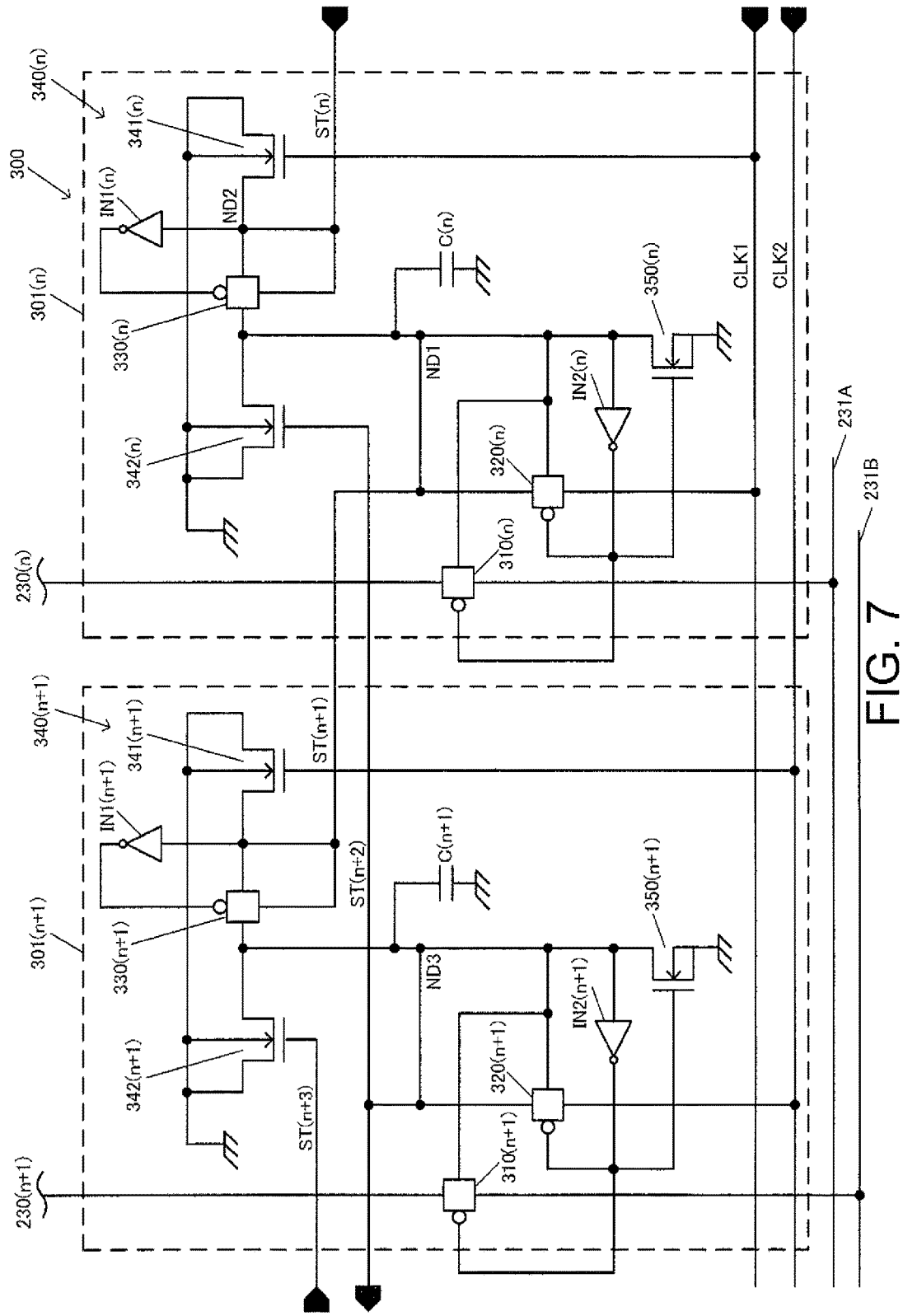
FIG. 7 is a diagram showing a modification that is additionally provided with a circuit for maintaining a reset state of output nodes of the register sections shown in FIG. 5.
Figure 8:
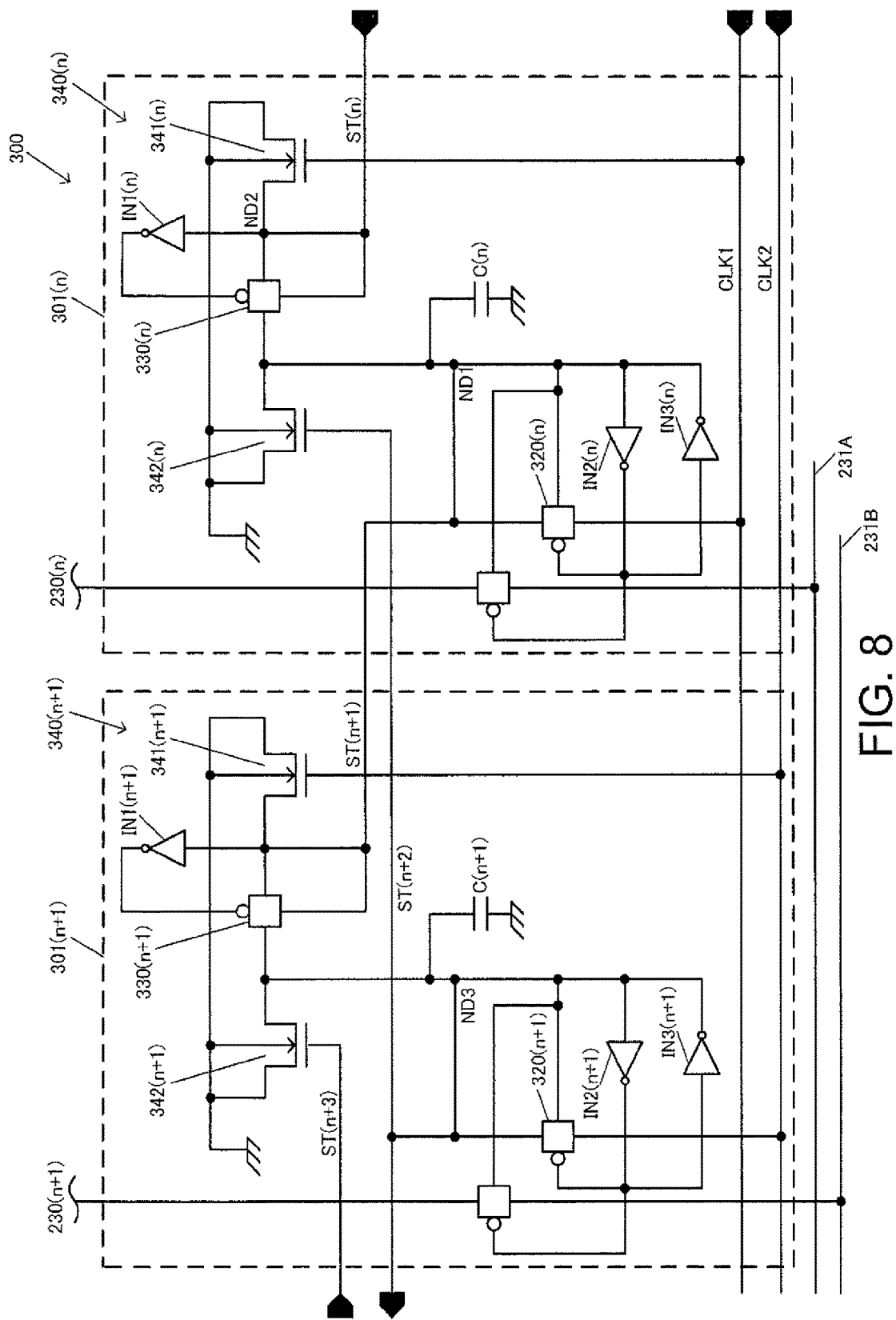
FIG. 8 is a diagram showing another modification that is additionally provided with a circuit for maintaining the reset state of the output nodes of the register sections shown in FIG. 5.

A reset state maintaining circuit shown in FIG. 7 or FIG. 8 may be additionally provided in the register sections 301(n) and 301 (n+1) shown in FIG. 5. The reset state maintaining circuit maintains the reset electric potentials of the output node ND1 and an output node ND3, which result from the resetting performed by the second reset transistors 342(n) and 342(n+1), even after the second reset transistors 342(n) and 342(n+1) are turned OFF. Consequently, it is possible to prevent the output node ND1 and the output node ND3, particularly in the floating state, from having an abnormal electric potential due to noise or the like.

As shown in FIG. 7, an NMOS transistor 350(n) that is connected to the output node ND1 and ground is additionally provided in the register section 301(n). The second inverter IN2(n) that inverts the voltage, or the logic level, of the output node ND1 is provided in the register section 301(n). Originally, the second inverter IN2(n) is intended to invert the electric potential, or the logic level, of the output node ND1 and to supply the inverted electric potential to the control terminal of at least one of the first transfer gate 310(n) and the second transfer gate 320(n) formed as CMOS logic circuits. This second inverter IN2(n) is connected to the gate of the NMOS transistor 350(n) as well. With this configuration, when the output node ND1 is at the reset electric potential Vss, the second inverter IN2(n) can turn ON the NMOS transistor 350(n), and connect the output node ND1 to the ground. Consequently, the reset state of the output node ND1 is maintained unless electrical current is supplied from the third transfer gate 330(n).

As shown in FIG. 8, a third inverter IN3(n) that is connected in parallel with the second inverter IN2(n) and that inverts the output from the second inverter IN2(n) may be additionally provided. The second and the third inverters IN2(n) and IN3(N) constitute a latch circuit, and the reset state of the output node ND1 is maintained in the same manner as in FIG. 7.

In FIG. 5, the holding capacitor C(n) is disposed between the output node ND1 of the control signal generation circuit 340(n) and the ground. However, the holding capacitor C(n) may be disposed between the output node ND1 of the control signal generation circuit 340(n) and a predetermined electric potential that is different from the ground, or another node.

Note that although the embodiment has been described in detail above, a person skilled in the art should easily understand that many modifications can be made without departing in substance from the novel matter and effects of the invention. Accordingly, all such modifications are within the scope of the invention.

The entire disclosure of Japanese Patent Application No. 2015-145930, filed Jul. 23, 2015 is expressly incorporated by reference herein.

What is claimed is:
1. A data transfer circuit, comprising
N stages of register sections that are connected in series and that respectively control transfer timings of N analogue signals, where N is an integer that is greater than or equal to 3, wherein
a register section at an n$^{th}$ (1<n<N) stage includes:
a first transfer gate that transfers one analogue signal out of the N analogue signals;
a second transfer gate that transfers one clock out of a clock signal, thereby generating an (n+1)$^{th}$ start signal for a register section at an (n+1)$^{th}$ stage;
a control signal generation circuit that generates control signals for the first transfer gate and the second transfer gate; and
a holding capacitor whose one end is connected to an output node of the control signal generation circuit, and that holds a voltage of the output node,
the control signal generation circuit includes a third transfer gate that transfers an n$^{th}$ start signal that is input from a register section at an (n−1)$^{th}$ stage, based on the n$^{th}$ start signal, and
the third transfer gate is formed as a CMOS logic circuit.
2. The data transfer circuit according to claim 1, wherein the control signal generation circuit includes:
a first reset transistor that resets an electric potential of an input node of the third transfer gate based on the clock signal; and
a second reset transistor that resets an electric potential of the output node based on an (n+2)$^{th}$ start signal that is output from a second transfer gate of the register section at the (n+1)$^{th}$ stage.

3. The data transfer circuit according to claim 2, wherein the clock signal that is input to the second transfer gate of the register section at the n$^{th}$ stage and a clock signal that is input to the second transfer gate of the register section at the (n+1)$^{th}$ stage have an inverse relation with each other.

4. The data transfer circuit according to claim 3, wherein the second transfer gate is formed as a CMOS logic circuit.

5. The data transfer circuit according to claim 3, wherein the first transfer gate is formed as a CMOS logic circuit.

6. The data transfer circuit according to claim 2, further comprising
a reset state maintaining circuit that maintains a reset electric potential of the output node even after the second reset transistor is turned OFF, the reset electric potential resulting from resetting performed by the second reset transistor.

7. The data transfer circuit according to claim 4, further comprising:
an NMOS transistor that is connected to the output node and ground; and
an inverting logic circuit that inverts the voltage of the output node, and supplies the inverted voltage to a control terminal of at least one of the first transfer gate and the second transfer gate and to a gate of the NMOS transistor, the first transfer gate and the second transfer gate each being formed as a CMOS logic circuit.

8. The data transfer circuit according to claim 4, further comprising
a first inverting logic circuit that inverts the voltage of the output node, and supplies the inverted voltage to a control terminal of at least one of the first transfer gate and the second transfer gate, the first transfer gate and the second transfer gate each being formed as a CMOS logic circuit; and
a second inverting logic circuit that is connected in parallel with the first inverting logic circuit, and inverts an output from the first inverting logic circuit.

9. The data transfer circuit according to claim 1, wherein another end of the holding capacitor is fixed at a predetermined electric potential.

10. An imaging circuit device, comprising:
a pixel section in which a light-receiving element is disposed in each of a plurality of pixels;
a read-out circuit section that reads out electric charge from the pixel section; and
a control circuit section that performs control to output pixel signals based on the read-out electric charge, wherein
the read-out circuit section includes the data transfer circuit according to claim 1.

11. An imaging circuit device, comprising:
a pixel section in which a light-receiving element is disposed in each of a plurality of pixels;
a read-out circuit section that reads out electric charge from the pixel section; and
a control circuit section that performs control to output pixel signals based on the read-out electric charge, wherein
the read-out circuit section includes the data transfer circuit according to claim 2.

12. An imaging circuit device, comprising:
a pixel section in which a light-receiving element is disposed in each of a plurality of pixels;
a read-out circuit section that reads out electric charge from the pixel section; and
a control circuit section that performs control to output pixel signals based on the read-out electric charge, wherein
the read-out circuit section includes the data transfer circuit according to claim 3.

13. An imaging circuit device, comprising:
a pixel section in which a light-receiving element is disposed in each of a plurality of pixels;
a read-out circuit section that reads out electric charge from the pixel section; and
a control circuit section that performs control to output pixel signals based on the read-out electric charge, wherein
the read-out circuit section includes the data transfer circuit according to claim 4.

14. An imaging circuit device, comprising:
a pixel section in which a light-receiving element is disposed in each of a plurality of pixels;
a read-out circuit section that reads out electric charge from the pixel section; and
a control circuit section that performs control to output pixel signals based on the read-out electric charge, wherein
the read-out circuit section includes the data transfer circuit according to claim 5.

15. An imaging circuit device, comprising:
a pixel section in which a light-receiving element is disposed in each of a plurality of pixels;
a read-out circuit section that reads out electric charge from the pixel section; and
a control circuit section that performs control to output pixel signals based on the read-out electric charge, wherein
the read-out circuit section includes the data transfer circuit according to claim 6.

16. An imaging circuit device, comprising:
a pixel section in which a light-receiving element is disposed in each of a plurality of pixels;
a read-out circuit section that reads out electric charge from the pixel section; and
a control circuit section that performs control to output pixel signals based on the read-out electric charge, wherein
the read-out circuit section includes the data transfer circuit according to claim 7.

17. An imaging circuit device, comprising:
a pixel section in which a light-receiving element is disposed in each of a plurality of pixels;
a read-out circuit section that reads out electric charge from the pixel section; and
a control circuit section that performs control to output pixel signals based on the read-out electric charge, wherein
the read-out circuit section includes the data transfer circuit according to claim 8.

18. An imaging circuit device, comprising:
a pixel section in which a light-receiving element is disposed in each of a plurality of pixels;
a read-out circuit section that reads out electric charge from the pixel section; and
a control circuit section that performs control to output pixel signals based on the read-out electric charge, wherein
the read-out circuit section includes the data transfer circuit according to claim 9.

19. An electronic apparatus comprising one imaging circuit device according to claim 10.

20. An electronic apparatus comprising a plurality of imaging circuit devices according to claim 10 that are connected in series.

\* \* \* \* \*